United States Patent
Kfir et al.

(10) Patent No.: US 10,701,190 B2
(45) Date of Patent: Jun. 30, 2020

(54) EFFICIENT PARSING OF OPTIONAL HEADER FIELDS

(71) Applicant: Mellanox Technologies TLV Ltd., Raanana (IL)

(72) Inventors: Aviv Kfir, Nili (IL); Barak Gafni, Campbell, CA (US); Avner Hadash, Kfar Saba (IL); Ortal Ben Moshe, Moshav Ein HaEmek (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 0 days.

(21) Appl. No.: 15/866,585

(22) Filed: Jan. 10, 2018

(65) Prior Publication Data

US 2019/0215384 A1 Jul. 11, 2019

(51) Int. Cl.
*H04W 72/04* (2009.01)
*H04L 29/06* (2006.01)
*H04L 12/935* (2013.01)
*H04L 12/741* (2013.01)

(52) U.S. Cl.
CPC .............. *H04L 69/22* (2013.01); *H04L 45/74* (2013.01); *H04L 49/3063* (2013.01); *H04L 69/161* (2013.01); *H04L 29/06* (2013.01)

(58) Field of Classification Search
CPC ....... H04L 69/22; H04L 69/161; H04L 45/74; H04L 49/3063; H04L 29/06
See application file for complete search history.

(56) References Cited

U.S. PATENT DOCUMENTS

| | | | |
|---|---|---|---|
| 5,394,394 A | 2/1995 | Crowther et al. | |
| 6,308,219 B1 | 10/2001 | Hughes | |
| 6,356,951 B1 | 3/2002 | Gentry, Jr. | |
| 6,788,680 B1 * | 9/2004 | Perlman | H04L 29/06 370/389 |

(Continued)

OTHER PUBLICATIONS

Gibb et al., "Design Principles for Packet Parsers", ACM/IEEE Symposium on Architectures for Networking and Communications Systems (ANCS), 12 pages, Oct. 2013.

(Continued)

*Primary Examiner* — Hassan Kizou
*Assistant Examiner* — Mahbubul Bar Chowdhury
(74) *Attorney, Agent, or Firm* — Kligler & Associates Patent Attorneys Ltd (57) ABSTRACT

Communication apparatus includes multiple interfaces configured to be connected to a network so as to receive and transmit data packets having respective packet headers that includes a basic header record and one or more optional records. Parsing instructions specify one or more types of the optional records and indicate, for each specified type, an offset within an optional record of the specified type. Upon receiving each packet, routing logic parses the basic header record in the packet, parses the one or more optional records so as to identify any optional records of the one or more specified types, extracts header data from the identified optional records at the offset indicated for the specified type, and processes and forwards the data packets via the interfaces to the network in accordance with information parsed from the basic header record and the extracted header data.

16 Claims, 3 Drawing Sheets

(56) References Cited

U.S. PATENT DOCUMENTS

| | | | | |
|---|---|---|---|---|
| 2003/0043848 | A1* | 3/2003 | Sonksen | H04L 69/22 370/474 |
| 2004/0081101 | A1* | 4/2004 | Bennett | H04L 41/5009 370/252 |
| 2004/0088430 | A1* | 5/2004 | Busi | H04L 45/16 709/238 |
| 2005/0089016 | A1* | 4/2005 | Zhang | H04L 43/00 370/351 |
| 2007/0276952 | A1* | 11/2007 | Mitchell | H04L 69/22 709/230 |
| 2008/0025308 | A1 | 1/2008 | Morgan et al. | |
| 2008/0095149 | A1* | 4/2008 | Dai | H04L 45/745 370/389 |
| 2013/0215906 | A1* | 8/2013 | Hidai | H04L 69/12 370/474 |
| 2015/0081726 | A1* | 3/2015 | Izenberg | H04L 47/2433 707/755 |
| 2015/0172189 | A1 | 6/2015 | Pitchai et al. | |
| 2015/0256456 | A1* | 9/2015 | Previdi | H04L 45/745 370/392 |
| 2015/0341265 | A1 | 11/2015 | Basso et al. | |
| 2016/0139892 | A1 | 5/2016 | Atreya et al. | |
| 2016/0197852 | A1* | 7/2016 | Hutchison | G06F 16/00 370/392 |
| 2017/0064047 | A1 | 3/2017 | Bosshart | |

OTHER PUBLICATIONS

Deering et al., "Internet Protocol, Version 6 (IPv6) Specification", Request for Comments: 2460, 39 pages, Dec. 1998.
Kfir et al., U.S. Appl. No. 15/836,986, filed Dec. 11, 2017.
University of Southern California, "Darpa Internet Program", Protocol Specification, RFC 791, 50 pages, Sep. 1981.
U.S. Appl. No. 15/836,986 office action dated Mar. 20, 2019.
U.S. Appl. No. 15/836,986 office action dated Sep. 16, 2019.

* cited by examiner

EFFICIENT PARSING OF OPTIONAL HEADER FIELDS

FIELD OF THE INVENTION

The present invention relates generally to packet communication networks, and particularly to apparatus and methods for routing packets in such networks.

BACKGROUND

In a packet communication network, routers receive packets through one of a set of input interfaces and forward them on through one of a set of output interfaces. Routing decisions are made on the basis of information in the packet header, which typically includes the destination address and source address of the packet, along with other information, such as the destination and source device ports, transport protocol, packet length, and priority. The form and contents of the packet header and the manner in which routing decision are made based on the packet header are specified by the network-layer protocol that is used in the network. The most common network-layer protocol is the Internet Protocol (IP), and in particular IP Version 4 (IPv4).

The IPv4 packet format is defined by Request for Comments (RFC) 791 of the Internet Engineering Task Force (IETF). In accordance with RFC 791, the IPv4 header comprises 14 fields, of which the first 13 are required, and the fourteenth is optional. The first 13 fields, referred to as the "basic header," have a total length of 20 bytes, while the fourteenth field, referred to as "options," can contain up to an additional 40 bytes. The Internet Header Length (IHL) field in the basic header indicates the total header length, which is limited to no more than 60 bytes.

Options in the IPv4 header (as well as in other protocols, such as the Transmission Control Protocol—TCP) are often encoded in a type-length-value (TLV) format. In this sort of format, each option is represented by a record that includes a type field indicating the type of information in the record; a length field indicating the size of the record (typically in bytes); and a value field containing the record data. Many different TLV records can be added as options to the same basic header, up to the total length constraint of 60 bytes. The order of the TLV records is arbitrary, so that a given TLV can be anywhere in the list of options.

SUMMARY

Embodiments of the present invention that are described hereinbelow provide improved methods and apparatus for routing data packets that contain optional header fields.

There is therefore provided, in accordance with an embodiment of the invention, communication apparatus, including multiple interfaces configured to be connected to a network so as to receive and transmit data packets having respective packet headers. At least some of the data packets have a packet header that includes a basic header record and one or more optional records of different, respective types. Routing logic is configured with parsing instructions specifying one or more of the types of the optional records and indicating, for each specified type, an offset within an optional record of the specified type. The routing logic is configured, upon receiving each packet among the at least some of the data packets, to parse the basic header record in the packet, to parse the one or more optional records so as to identify any optional records of the one or more specified types, to extract header data from the identified optional records at the offset indicated for the specified type, and to process and forward the data packets via the interfaces to the network in accordance with information parsed from the basic header record and the extracted header data.

In the disclosed embodiments, the routing logic is configured to skip over any of the optional records that are not of the one or more specified types, and to process and forward the data packets without regard to the optional records that have been skipped over.

In some embodiments, the optional records have a type-length-value (TLV) format including a respective type field in each optional record, and the routing logic is configured to read a type value from the type field and to match the type value against a set of one or more specified type values in order to identify the optional records of the one or more specified types. typically the optional records of the TLV format include a respective value field in each optional record, and in one embodiment, the value field for at least one of the types of the optional records contains a pointer value, and the routing logic is configured to read the pointer value and to extract the header data from the optional records of the at least one of the types at the indicated offset relative to a location indicated by the pointer value.

Additionally or alternatively, the parsing instructions indicate multiple, different offsets for at least one of the types of the optional records, and the routing logic is configured to extract the header data from the identified optional records of the at least one of the types at each of the multiple, different offsets.

In a disclosed embodiment, the routing logic includes a context memory and a plurality of extraction engines, each configured to extract the header data from one of the optional records and to write the extracted header data to the context memory. A parsing engine is configured to parse the basic header record in the packets and to write the information parsed from the basic header record to the context memory, and to parse the one or more optional records so as to identify the optional records of the one or more specified types, and for each identified optional record in a given packet, to instruct a respective one of the execution engines to extract the header data from the identified optional record at the offset indicated for the specified type. A control pipeline is configured to process the data packets using the information parsed from the basic header record and the extracted header data held in the context memory.

In one embodiment, the packet header that includes the basic header record and the one or more optional records is an Internet Protocol Version 4 (IPv4) header, and the optional records include IPv4 options.

There is also provided, in accordance with an embodiment of the invention, a method for communication, which includes receiving from a network data packets having respective packet headers. At least some of the data packets have a packet header that includes a basic header record and one or more optional records of different, respective types. One or more of the types of the optional records are specified, and for each specified type, an offset within an optional record of the specified type is indicated. Upon receiving each packet among the at least some of the data packets, the basic header record in the packet is parsed, and the one or more optional records are parsed so as to identify any optional records of the one or more specified types. Header data are extracted from the identified optional records at the offset indicated for the specified type. The data packets are processed and forwarded to the network in accordance with information parsed from the basic header record and the extracted header data.

The present invention will be more fully understood from the following detailed description of the embodiments thereof, taken together with the drawings in which:

DETAILED DESCRIPTION OF EMBODIMENTS

Overview

As a first step in deciding how to forward a given packet, a router (or other network switch) generally parses the packet header, i.e., identifies the fields in the packet header that contain relevant information and extracts the information from these fields that is to be used by the routing logic. This sort of header parsing, along with other packet processing operations, is generally carried out by hardware logic and therefore lacks the flexibility of software-driven processing. Handling the options in the IPv4 header can be particularly challenging in this context, since in contrast to the fixed structure of the basic header, the choice of optional records and their order can vary from packet to packet. Similar problems arise in parsing of other protocol headers that can include variable options, such as the TCP header.

One possible response to this difficulty, which is commonly adopted in simpler routers, is to parse only the basic header and skip over the options. It is not necessary to process the IPv4 header options in order to comply with the standard, but in this case the router will not support advanced network functions, such as network security and route monitoring, that the options can provide.

In the alternative, the router can be configured to parse and process the entire IPv4 header, including options. This approach, however, requires that the router have sufficient memory resources to hold all of the header data that the parser extracts from packets in transit through the router. These demands increase the size and cost of the router.

Embodiments of the present invention address these difficulties by extracting only certain segments of specified types of the optional records that may appear in the header. For this purpose, the parser in a network device, such as a router, is pre-configured with parsing instructions that specify one or more of the types of possible optional records and indicate, for each specified type, the offset within the corresponding record of the data that the parser should extract. The parsing instructions can indicate different offsets for different types of optional records, as well as multiple, different offset values within a single optional record of a given type. On the basis of these capabilities, a system operator can configure the parser to recognize and select one or more desired option types, and to extract only the specific data that are needed from the selected optional records (from a single byte up to the entire record).

For each packet received through the network interfaces of a router that is configured in this manner, the parser will parse the basic header record in the packet, and will also read the options in the packet header in order to identify the respective type of each optional record. Specifically, when the optional records have a TLV format, the parser can read the type value from the type field of each record and match the type value against a set of specified type values. When the parser encounters an optional record with a type value that matches one of the specified types, it goes on to extract header data from this optional record at the offset indicated by the parser configuration for this option type. The parser does not attempt to extract the remaining options data in the header, and skips entirely over any optional records that do not belong to one of the specified types.

Based on the information extracted by the parser from the basic header record and specified optional records, the routing logic goes on to process and forward the data packets via the appropriate interfaces of the router to the network. The routing logic ignores the remaining options data, which were skipped over by the parser, and is thus relieved of the memory requirements that would otherwise be incurred. Selective extraction of the header data also simplifies subsequent processing in the control pipeline of the routing logic. In this way, the resources of the router are focused exactly where they are needed to provide rapid, efficient packet throughput while supporting advanced packet processing functionality.

For the sake of clarity and concreteness, the embodiments that are described hereinbelow are directed specifically to parsing of the IPv4 basic header and options. In alternative embodiments, the principles of the present invention may be applied, mutatis mutandis, in processing of packets transmitted in accordance with other protocols that allow flexibility in composition of the options in the packet header, including both network-layer and upper-layer protocols, such as TCP. Furthermore, although the disclosed embodiments relate specifically to routers, the principles of the present invention may similarly be applied to other sorts of communication apparatus that process and forward packets in accordance with network-layer protocols (and possibly higher protocol layers), such as switches, gateways, and network interface controllers.

System Description

Figure 1:
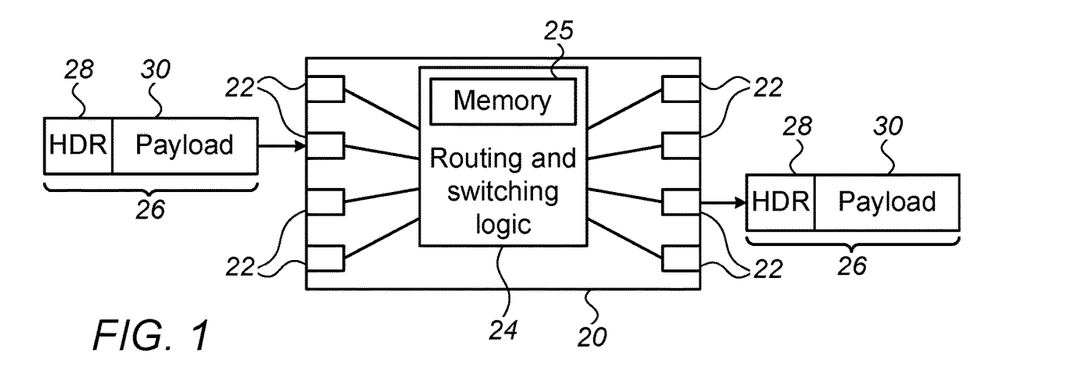
FIG. 1 is a block diagram that schematically illustrates a router, in accordance with an embodiment of the invention.

FIG. 1 is a block diagram that schematically illustrates a router 20, in accordance with an embodiment of the invention. Router 20 comprises multiple interfaces 22, which are connected to a network (not shown), such as an IP network. Interfaces 22 comprise, for example, ports comprising suitable physical layer (PHY) and medium access control (MAC) interfaces, as are known in the art, for receiving and transmitting data packets 26 from and to the network. Interfaces 22 are typically bidirectional, both receiving and transmitting packets; but alternatively, some or all of the interfaces may be configured exclusively as ingress interfaces or egress interfaces. Each incoming packet 26 has a respective packet header 28, followed by a payload 30. Packet header 28 typically comprises multiple sub-headers and records, which are illustrated in FIG. 2.

Routing and switching logic 24 parses and processes headers 28 of received packets 26, using instructions and information stored in a memory 25. (Although memory 25 is shown in FIG. 1, for the sake of conceptual clarity, as a distinct block within routing and switching logic 24, in practice this memory may be integrated locally with the routing and switching circuits, and may comprise either read/write or read-only memory cells.) Based on these instructions and the information extracted from the parsed headers, routing and switching logic 24 processes and forwards the data packets via the appropriate interfaces 22 to the network. At least some parts of the headers are typically updated or otherwise modified by routing and switching logic 24 in order to generated headers 28 of the transmitted packets 26.

Typically, routing and switching logic 24 comprises digital logic circuits, which may be hard-wired or programmable and are configured to carry out the functions that are described herein, along with other routing and switching functions that are known in the art. Additionally or alternatively, routing and switching logic may comprise a processor, such as an embedded microprocessor, which is programmed in software to carry out at least some of these functions. Router 20 typically comprises a single integrated circuit chip, for example an application-specific integrated circuit (ASIC), comprising interfaces 22, logic 24 and memory 25. Alternatively, router 20 may be implemented in a set of two or more chips that carry out these functions.

Figure 2:
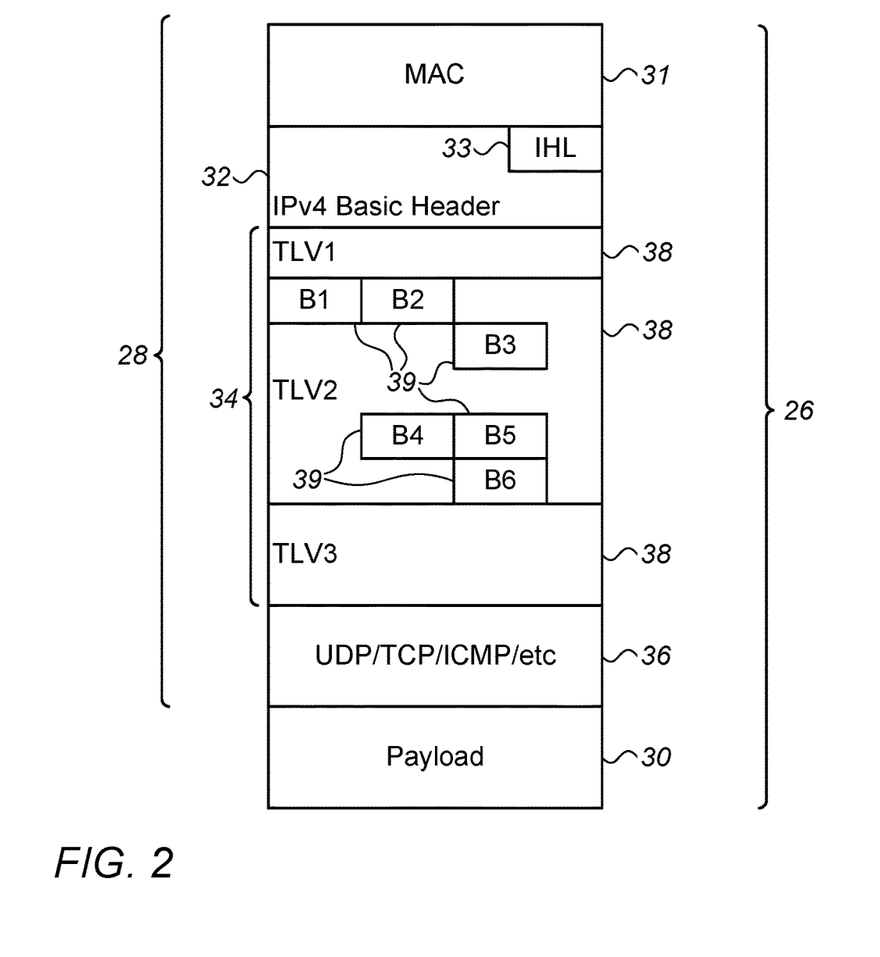
FIG. 2 is a block diagram that schematically illustrates the structure of an IPv4 packet, which is parsed in accordance with an embodiment of the invention.

FIG. 2 is a block diagram that schematically illustrates the structure of packet 26, in this case an IPv4 packet, which is parsed and processed by router 20 in accordance with an embodiment of the invention. Packet header 28 includes multiple sub-headers 31, 32, 34, 36 of different, respective types, from among a set of predefined types that router 20 is programmed to handle. Specifically, the sub-headers in packet header 28 begin with a MAC header 31, followed by an IP header comprising an IPv4 basic header 32 (also referred to herein as a "basic header record") and options 34 including (in this example) three optional records 38, and then an upper-layer header 36. An IHL field 33 in basic header 32 indicates the total header length, as noted earlier.

Optional records 38 are assumed in this example to be encoded in a TLV format, as defined above, and are identified in the figure as TLV1, TLV2 and TLV3. (Alternatively, the principles of the present invention may be applied, mutatis mutandis, to header records that use other type-based encoding schemes.) In the present example, it is also assumed that the record type of TLV2 has been specified for use in processing and forwarding of data packets by router 20. Only certain header data 39 within TLV2—marked in FIG. 2 as bytes B1, B2, . . . , B6—are actually extracted and used in the processing and forwarding functions in question. These features of header 28 will be referred to in the description that follows.

Figure 3:
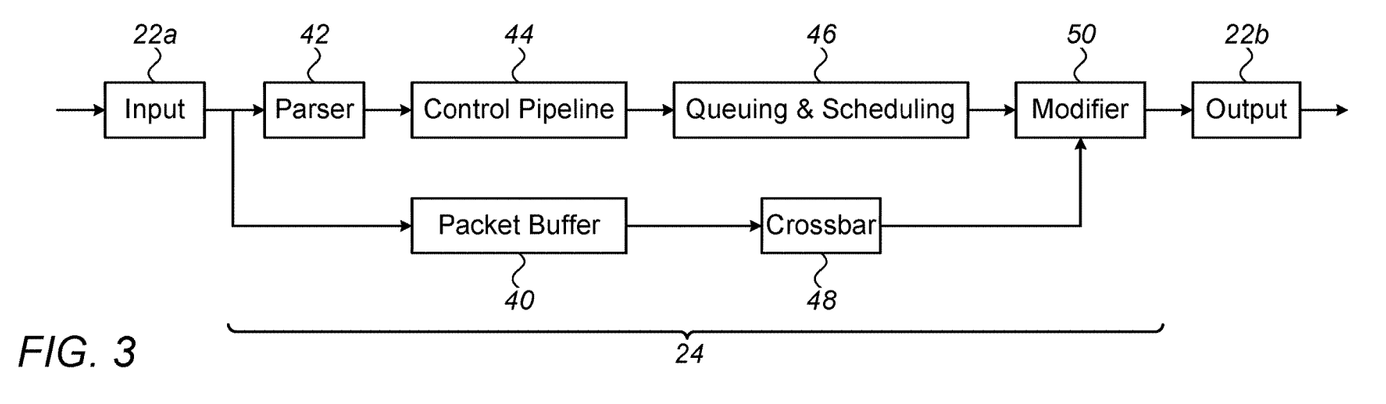
FIG. 3 is a block diagram that schematically illustrates routing and switching logic, in accordance with an embodiment of the invention.

FIG. 3 is a block diagram that schematically shows details of routing and switching logic 24, in accordance with an embodiment of the invention. This figure shows the elements of logic 24 in the order in which they typically operate on a packet 26 that is received through an input (or ingress) interface 22a, until the packet is transmitted out to the network through an output (or egress) interface 22b. This particular functional organization is shown here by way of example, to illustrate particularly the role of a parser 42 in parsing packet headers. Alternative implementations will be apparent to those skilled in the art after reading the present description and are considered to be within the scope of the present invention.

Payloads 30 of incoming packets 26 (and possibly headers 28, as well) are stored in a packet buffer 40 while awaiting processing of packet headers 28. Meanwhile, parser 42 parses each of sub-headers 31, 32, 34, 36 in turn in accordance with predefined parsing instructions, and thus extracts relevant data from the sub-headers. Parser 42 passes the parsing results to a control pipeline 44, which uses this information in deciding how each packet should be handled. Specifically, control pipeline 44 selects output interface 22b (or interfaces) through which each packet is to be forwarded, as well as setting control parameters, such as transmission priority, and deciding on changes to be made in outgoing packet headers 32.

Queuing and scheduling logic 46 queues each packet 26 for transmission through the chosen output interface 22b. When a packet reaches the head of its queue, a crossbar switch 48 transfers the packet data to a packet modifier 50, which updates the fields in header 32 in accordance with the instructions prepared by control pipeline 44. The packet is then transmitted to the network through output interface 22b.

Header Parsing Operations

Figure 4:
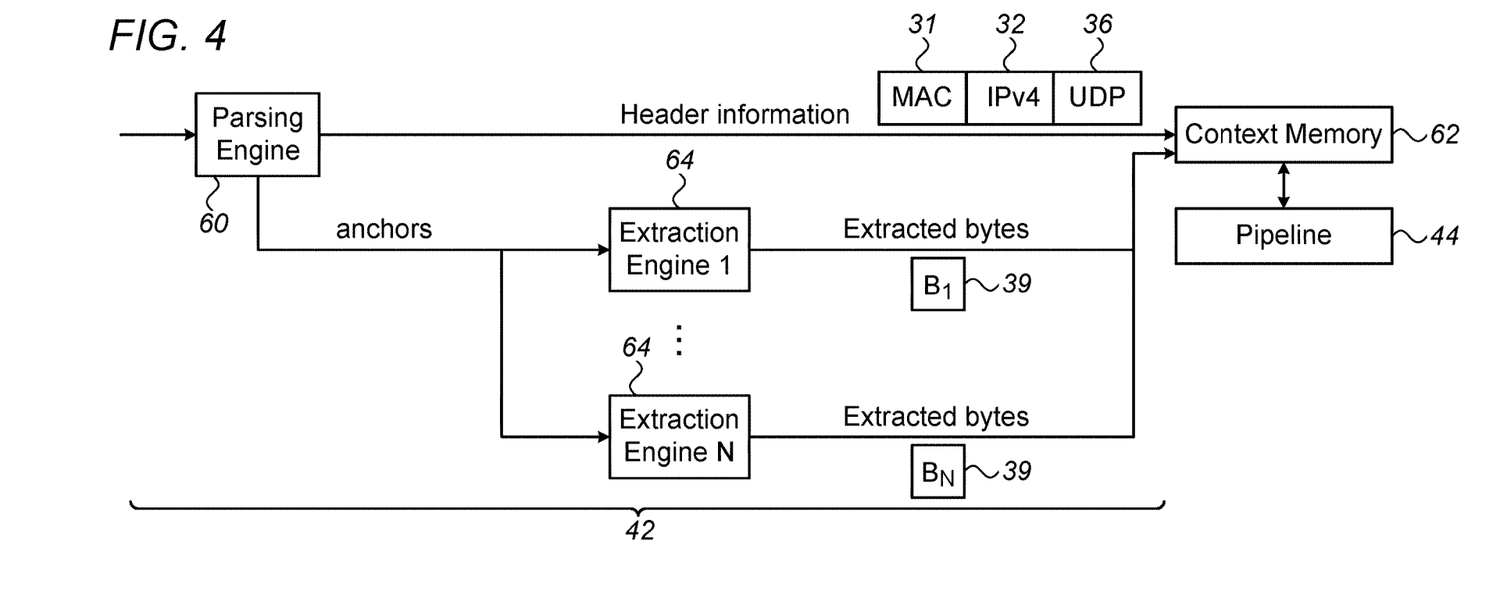
FIG. 4 is a block diagram that schematically shows details of a packet parser, in accordance with an embodiment of the invention.

FIG. 4 is a block diagram that schematically shows details of packet parser 42, in accordance with an embodiment of the invention. Packet parser 42 comprises digital logic configured to locate and read out the data values of relevant fields in each of sub-headers 31, 32, 34, 36, and to pass the extracted header data to control pipeline 44. Parser 42 is configured with parsing instructions, which specify how each of the sub-headers is to be handled, and which in particular specify the types of optional records 38 that are to be parsed and indicate, for each specified type, the offset or offsets within the optional record at which data are to be extracted.

In the present embodiment, by way of example, the parsing instructions include the following points:

Per-header option parsing enable—When enabled, parser 42 will parse options 34.

Per-header basic header size—Sets the size of basic header 32, wherein extra header data beyond this size is considered to belong to options 34. For example, in IPv4, the basic header size is set to 20 bytes.

Per-header length field—Identifies the field in header 28 (specifically in basic header 32 in the present case) that specifies the total header length and the required linear manipulation of the value of this field in order to compute the actual header length in bytes. For example, in IPv4 this instruction indicates the location of IHL field 33, and the required manipulation is to multiply it by four in order to transform the IHL value to bytes. Thus, if IHL field 33 holds the value 11, for instance, it means that the IPv4 header size is 44 bytes, of which basic header 32 takes 20 bytes, so that the next 24 bytes are treated as options 34.

Per-header TLV format definition—Defines where the 'T' (Type) field and 'L' (Length) field are located in optional records 38. For example, in IPv4 options 34, each TLV is defined such that the first byte is the 'T' field and the second byte is the 'L' field.

Per-header type extraction—Defines the types of optional records 38 to be extracted in terms of the values of the corresponding 'T' field. For example if the "Router-Alert" option is to be parsed, parsing engine 60 is configured to identify TLV records with the value T=0×94. Multiple type values may be specified, depending on hardware implementation of parser 42. In this case, parser 42 will extract all TLV records that match one of the configured 'T' values.

Per-TLV anchor—Indicates the location of the header data that are to be extracted from the 'V' (value) field of each specified type of TLV. (In some cases, multiple, different offsets may be specified for a given type of TLV, and each offset will be represented by its own anchor.) Each anchor comprises the following fields:

Anchor-id—Indicates the reference location in the value field from which parser 42 is to measure the offset. The reference location may be fixed, or it may depend on a pointer value, which may vary, within the value field of the TLV. An example of this sort of dynamic anchor is described hereinbelow with reference to FIG. 5.

Offset—Indicates the offset (in bytes) relative to the anchor-id value from which to extract the data. For example anchor-id=1 and offset=10 means that parser 42 is to extract the tenth byte relative to anchor-id 1.

As illustrated in FIG. 4, parser 42 comprises a parsing engine 60, which parses the fixed parts of header 28, such as MAC header 31, IPv4 basic header 32, and a User Datagram Protocol (UDP) upper-layer header 36, and writes the information parsed from these headers in each packet to a context memory 62. Parsing engine 60 also parses optional records 38, in accordance with the instructions described above, in order to identify the optional records having type (T) values that match those that have been specified in the parser configuration.

In addition, parser 42 comprises multiple extraction engines 64, which extract header data 39 from appropriate offsets within specified optional records 38 and write the extracted header data to context memory 62. Upon identifying such an optional record in a given packet, for which the type value matches one of the values specified in the parsing instructions, parsing engine 60 reads the offset (or offsets) of header data 39 that are to be extracted from the record, and instructs one of extraction engines 64 to extract the header data accordingly. For this purpose, parsing engine 60 generates and passes a corresponding anchor to each extraction engine 64, including the anchor-id and offset, as explained above. In the example shown in FIG. 4, each extraction engine 64 extracts a single byte of data, from $B_1$ to $B_N$; but alternatively, the extraction engines may extract data with coarser granularity. Depending on packet configuration, parsing engine 60 may distribute different anchors from each packet to each of the parsing engines.

Once parsing of a given packet has been completed, and the specified header data have been written to context memory 62, control pipeline 44 reads the information from the context memory and processes the packet accordingly.

Figure 5:
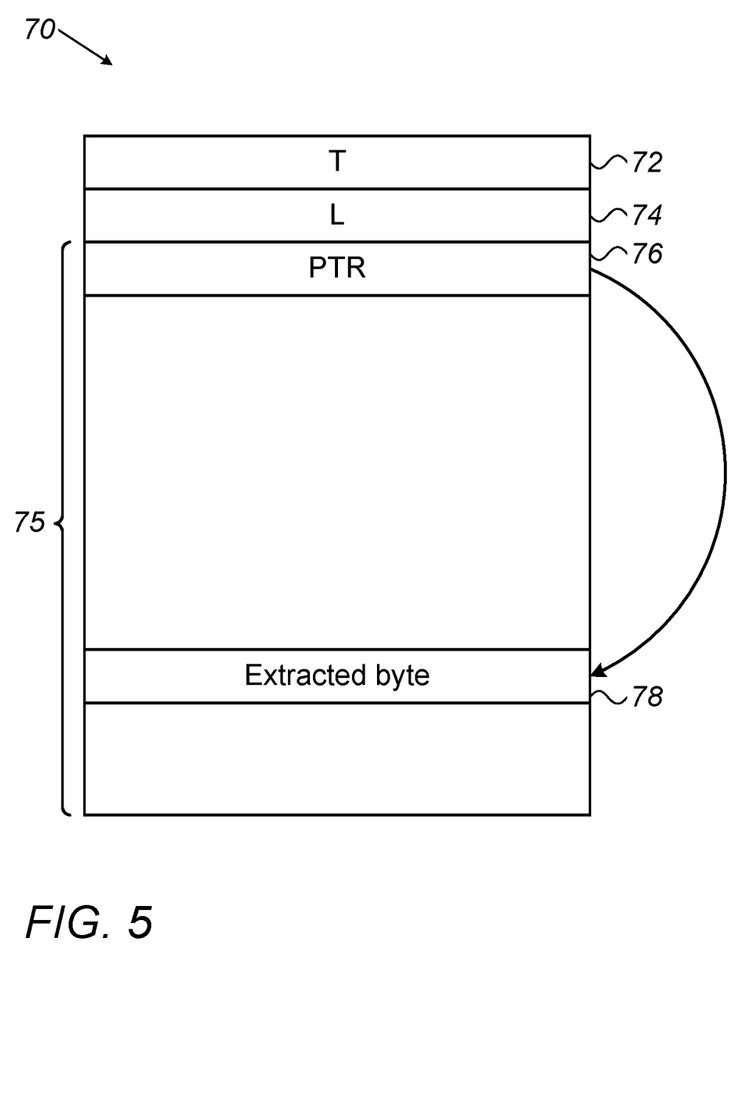
FIG. 5 is a block diagram that schematically illustrates an optional record, which is parsed in accordance with an embodiment of the invention.

FIG. 5 is a block diagram that schematically illustrates an options record 70, which is parsed in accordance with an embodiment of the invention. Record 70 can appear in place of one of optional records 38 within options 34 (FIG. 2). Record 70 has a TLV format, as defined above, including a type (T) field 72, a length (L) field 74, and a value field 75. Value field 75 contains a pointer value 76, which indicates the offset to a byte 78 that is to be extracted and used by router 20. In other words, in records of this type, parser 42 cannot simply use a fixed offset within the record for extracting the desired header data, i.e., byte 78, but rather should adjust the offset dynamically. This sort of situation can arise, for example, in source routing options, as are known in the art, in which pointer value 76 is incremented in each hop of the packet along a predefined path so as to point to a data value identifying the next router on the path.

To deal with this sort of situation, parsing engine generates a dynamic anchor, in which the reference location of the anchor-id varies, for example according to pointer value 76. Parsing engine 60 calculates and passes the dynamic anchor to one of extraction engines 64, which then extracts byte 78 from optional record 70 at the indicated offset relative to the location indicated by the pointer value.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Communication apparatus, comprising:

multiple interfaces configured to be connected to a network so as to receive and transmit data packets having respective packet headers, wherein at least some of the data packets have a packet header that includes a basic header record and one or more optional records of different, respective types;

a memory configured with parsing instructions, each parsing instruction specifying one of the types of the optional records and indicating at least one offset within the optional record of the specified type, wherein the parsing instruction for at least one of the types includes multiple different offset values; and routing logic configured, for each type of the optional records, with an enable indication, which indicates whether data is to be extracted from optional records of the type, wherein the routing logic is configured, upon receiving each packet among the at least some of the data packets, to parse the basic header record in the packet, to parse the one or more optional records, and for each of the parsed one or more optional records:

to identify the respective type of the parsed optional record, to determine whether data is to be extracted from the parsed optional record, responsively to the corresponding enable indication of the type of the parsed optional record, and for optional records from which data is determined to be extracted, to access a corresponding parsing instruction of the type of the optional record, in the memory and accordingly to extract header data from the at least one offset indicated for the specified type, and to process and forward the data packets via the interfaces to the network in accordance with information parsed from the basic header record and the extracted header data, wherein the routing logic is configured to extract header data only from optional records of one or more specified types indicated as requiring data extraction in their corresponding enable indication, entirely skipping optional records not of the one or more specified types, and wherein the routing logic is configured to extract from the optional records identified as of the at least one of the specified types, the header data referred to by the multiple different offset values, without extracting other data in the identified optional records of the at least one of the types.

2. The apparatus according to claim 1, wherein the routing logic is configured to skip over any of the optional records that are not of the one or more specified types, and to process and forward the data packets without regard to the optional records that have been skipped over.

3. The apparatus according to claim 1, wherein the optional records have a type-length-value (TLV) format including a respective type field in each optional record, and wherein the routing logic is configured to read a type value from the type field and to match the type value against a set of one or more specified type values in order to identify the optional records of the one or more specified types.

4. The apparatus according to claim 3, wherein the optional records of the TLV format include a respective value field in each optional record, and wherein the value field for at least one of the types of the optional records contains a pointer value, and wherein the routing logic is configured to read the pointer value and to extract the header data from the optional records of the at least one of the types at the indicated offset relative to a location indicated by the pointer value.

5. The apparatus according to claim 1, wherein the routing logic comprises:
 a context memory;
 a plurality of extraction engines, each configured to extract the header data from one of the optional records and to write the extracted header data to the context memory;
 a parsing engine, which is configured to parse the basic header record in the packets and to write the information parsed from the basic header record to the context memory, and to parse the one or more optional records so as to identify the optional records of the one or more specified types, and for each identified optional record in a given packet, to instruct a respective one of the plurality of extraction engines to extract the header data from the identified optional record at the offset indicated for the specified type; and
 a control pipeline, which is configured to process the data packets using the information parsed from the basic header record and the extracted header data held in the context memory.

6. The apparatus according to claim 1, wherein the packet header that includes the basic header record and the one or more optional records is an Internet Protocol Version 4 (IPv4) header, and wherein the optional records comprise IPv4 options.

7. The apparatus according to claim 1, wherein the basic header record includes a field which indicates a total header length of the packet header.

8. The apparatus according to claim 1, wherein the routing logic comprises a parsing engine and a plurality of extraction engines, wherein the parsing engine is configured to identify optional records of types from which data is to be extracted, to generate anchors indicating the location of data to be extracted and to pass the anchors to respective ones of the extraction engines, wherein the extraction engines extract the data using the anchors from the parsing engine.

9. The apparatus according to claim 1, wherein the parsing engine is configured to generate for at least one of the optional records a plurality of anchors, and to provide each of the plurality of anchors to a different one of the plurality of extraction engines.

10. A method for communication, comprising:
 configuring a memory with parsing instructions, each parsing instruction specifying one of a plurality of types of optional records and indicating at least one offset within the optional record of the specified type, wherein the parsing instruction for at least one of the types includes multiple different offset values;
 receiving from a network data packets having respective packet headers, wherein at least some of the data packets have a packet header that includes a basic header record and one or more of the optional records of different, respective types;
 specifying one or more of the types of the optional records and indicating, for each specified type, whether data is to be extracted from optional records of the specified type;
 upon receiving each packet among the at least some of the data packets:
  parsing the basic header record in the packet;
  parsing the one or more optional records, and for each of the parsed one or more optional records:
   identifying the respective type of the parsed optional record,
   determining whether data is to be extracted from the parsed optional record, responsively to the corresponding enable indication of the type of the parsed optional record, and
   for optional records from which data is determined to be extracted, accessing a corresponding parsing instruction of the type of the optional record; and extracting header data from the at the offset indicated for the specified type; and
 processing and forwarding the data packets to the network in accordance with information parsed from the basic header record and the extracted header data,
 wherein extracting the header data comprises extracting header data only from optional records of one or more specified types indicated as requiring data extraction in their corresponding enable indication, while entirely skipping optional records not of the one or more specified types, and
 wherein extracting the header data comprises extracting from the optional records identified as of a specified type, header data referred to by the multiple different offset values, without extracting other data in the identified optional records of the specified type.

11. The method according to claim 10, wherein parsing the one or more optional records comprises skipping over any of the optional records that are not of the one or more specified types, wherein the data packets are processed and forwarded without regard to the optional records that have been skipped over.

12. The method according to claim 10, wherein the optional records have a type-length-value (TLV) format including a respective type field in each optional record, and wherein parsing the one or more optional records comprises reading a type value from the type field and matching the type value against a set of one or more specified type values in order to identify the optional records of the one or more specified types.

13. The method according to claim 12, wherein the optional records of the TLV format include a respective value field in each optional record, and wherein the value field for at least one of the types of the optional records contains a pointer value, and wherein extracting the header data comprises reading the pointer value and extracting the header data from the optional records of the at least one of the types at the indicated offset relative to a location indicated by the pointer value.

14. The method according to claim 10, wherein parsing the basic header record comprises writing the information parsed from the basic header record to a context memory, and wherein extracting the header data comprises, for each identified optional record in a given packet, instructing a respective one of a plurality of extraction engines to extract the header data from the identified optional record at the offset indicated for the specified type, and to write the extracted header data to the context memory, and wherein processing and forwarding the data packets comprises reading from the context memory and applying the information parsed from the basic header record and the extracted header data in processing the data packets.

15. The method according to claim 10, wherein the packet header that includes the basic header record and the one or more optional records is an Internet Protocol Version 4 (IPv4) header, and wherein the optional records comprise IPv4 options.

16. Communication apparatus, comprising:

multiple interfaces configured to be connected to a network so as to receive and transmit data packets having respective packet headers, wherein at least some of the data packets have a packet header that includes a basic header record and one or more optional records of different, respective types; and routing logic, comprising:

a context memory;

a plurality of extraction engines, each configured to extract header data from optional records responsive to provided anchors including a reference location and an offset and to write the extracted header data to the context memory;

a parsing engine, which is configured to parse the basic header record in the packets and to write the information parsed from the basic header record to the context memory, and to parse the one or more optional records so as to identify the optional records of one or more specified types from which data is to be extracted, and for each identified optional record in a given packet, to generate one or more anchors, and to provide each of the anchors to a respective one of the plurality of extraction engines to extract the header data from the identified optional record at the offset indicated by the anchor; and a control pipeline, which is configured to process the data packets using the information parsed from the basic header record and the extracted header data held in the context memory.

* * * * *